(12) United States Patent
Fischer et al.

(10) Patent No.: US 7,907,614 B2
(45) Date of Patent: Mar. 15, 2011

(54) FAST BLOCK ACKNOWLEDGMENT GENERATION IN A WIRELESS ENVIRONMENT

(75) Inventors: Matthew J. Fischer, Mountain View, CA (US); George Kondylis, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 931 days.

(21) Appl. No.: 11/558,889

(22) Filed: Nov. 10, 2006

(65) Prior Publication Data

US 2007/0110055 A1 May 17, 2007

Related U.S. Application Data

(60) Provisional application No. 60/735,504, filed on Nov. 11, 2005.

(51) Int. Cl.
*H04L 1/00* (2006.01)
(52) U.S. Cl. ....................................................... 370/394
(58) Field of Classification Search .................. 370/236, 370/235, 389, 394
See application file for complete search history.

(56) References Cited

U.S. PATENT DOCUMENTS

| | | | | |
|---|---|---|---|---|
| 6,820,170 B1 * | 11/2004 | Elnathan et al. | ............... | 711/108 |
| 7,031,674 B2 * | 4/2006 | Kataoka et al. | ............ | 455/115.1 |
| 7,039,914 B2 * | 5/2006 | Potter, Jr. | ...................... | 718/102 |
| 7,194,000 B2 * | 3/2007 | Balachandran et al. | . | 370/395.42 |
| 7,385,976 B2 * | 6/2008 | Gu et al. | ....................... | 370/389 |
| 7,535,858 B2 * | 5/2009 | Trainin et al. | ................. | 370/278 |
| 2006/0034174 A1 * | 2/2006 | Nishibayashi et al. | ....... | 370/235 |

* cited by examiner

*Primary Examiner* — Derrick W Ferris
*Assistant Examiner* — Mohammad Anwar
(74) *Attorney, Agent, or Firm* — Garlick Harrison & Markison; Kevin L. Smith

(57) ABSTRACT

Fast block acknowledgment generation is provided, via a receiving station, for a plurality of received frames to accommodate latency-sensitive data applications. The fast block acknowledgment generation includes receiving a frame of the plurality of received frames including a transmitter address, a quality of service (QoS) value, and a sequence number. A match to the transmitter address and the QoS value is conducted under a concurrent search to expedite access to a block acknowledgement (ACK) structure, the match provides an index to the block ACK structure. When a block ACK agreement exists that corresponds to the transmitter address and the QoS value, the block ACK structure is accessed based upon the index and storing an acknowledgement state for the received frame in a bitmap of the block ACK structure, and when receipt of the plurality of frames is complete, generating, queuing, and transmitting of a block ACK frame based upon the ACK policy field of the received frame.

17 Claims, 11 Drawing Sheets portion of protocol stack 140

FAST BLOCK ACKNOWLEDGMENT GENERATION IN A WIRELESS ENVIRONMENT

CROSS REFERENCE TO RELATED APPLICATIONS

This application claims priority to U.S. Provisional Application Ser. No. 60/735,504 entitled "RIFS Block Acknowledgment," filed Nov. 11, 2005, expired, which is hereby incorporated herein by reference in its entirety for all purposes.

TECHNICAL FIELD

The present invention relates to wireless communications and, more particularly, to accommodating delay-sensitive data applications in wireless communications.

RELATED ART

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services ("AMPS"), digital AMPS, global system for mobile communications ("GSM"), code division multiple access ("CDMA"), local multi-point distribution systems ("LMDS"), multi-channel-multi-point distribution systems ("MMDS"), and/or variations thereof.

Depending on the type of wireless communication system, a wireless communication device, such as a cellular telephone, two-way radio, personal digital assistant ("PDA"), personal computer ("PC"), laptop computer, home entertainment equipment, etc., communicates directly or indirectly with other wireless communication devices. For direct communications (also known as point-to-point communications), the participating wireless communication devices tune their receivers and transmitters to the same channel or channels (for example, one of a plurality of radio frequency ("RF") carriers of the wireless communication system) and communicate over that channel(s). For indirect wireless communications, each wireless communication device communicates directly with an associated base station (for example, for cellular services) and/or an associated access point (for example, for an in-home or in-building wireless network) via an assigned channel. To complete a communication connection between the wireless communication devices, the associated base stations and/or associated access points communicate with each other directly, via a system controller, via a public switch telephone network ("PSTN"), via the Internet, and/or via some other wide area network.

Each wireless communication device includes a built-in radio transceiver (that is, receiver and transmitter) or is coupled to an associated radio transceiver (for example, a station for in-home and/or in-building wireless communication networks, RF modem, et cetera). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

One common problem in processing a plurality of frames for delay sensitive data applications is the ability to generate a block acknowledgment at a rate sufficient to avoid reducing the efficiency and increased data throughput to a receiving station. What is needed, therefore, is fast block acknowledgment generation to a plurality of frames having increased data throughput.

SUMMARY OF THE INVENTION

The present invention is directed to apparatus and methods of operation that are further described in the following Brief Description of the Drawings, the Detailed Description of the Drawings, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
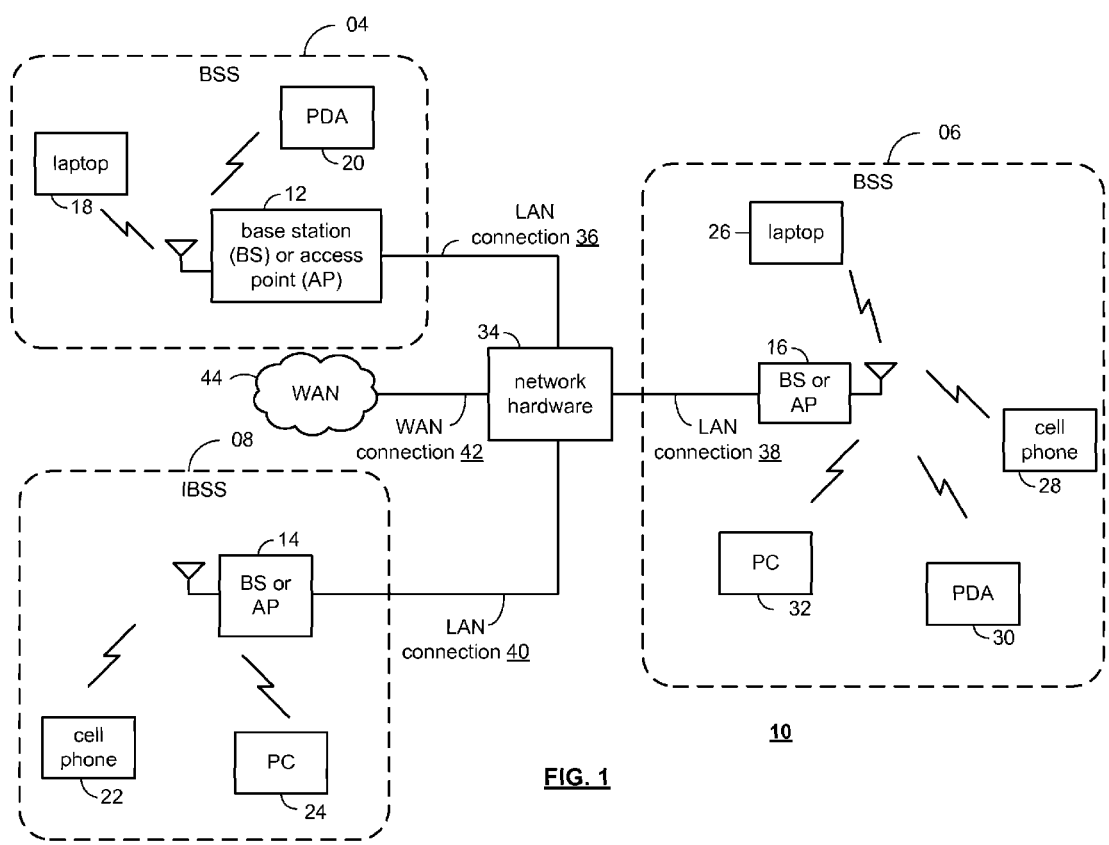
FIG. 1 is a functional block diagram illustrating a communication system that includes circuit devices and network elements and operation thereof according to an embodiment of the invention.

FIG. 1 is a functional block diagram illustrating a communication system that includes circuit devices and network elements and operation thereof according to an embodiment of the invention. More specifically, a plurality of network service areas 04, 06 and 08, or basic service sets ("BSS") are a part of a network 10. Network 10 includes a plurality of base stations or access points ("APs") 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to FIGS. 2 through 10.

The base stations or APs 12-16 are coupled to the network hardware component 34 via local area network ("LAN") connections 36, 38 and 40. The network hardware component 34, which may be a router, switch, bridge, modem, system controller, etc., provides a wide area network ("WAN") connection 42 for the communication system 10 to an external network element such as WAN 44. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (that is, point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

To support latency-sensitive data applications, the network 10 differentiates and prioritizes the different possible data types. In general, wireless communication systems had provided a suitable platform or medium for low-bandwidth, latency-insensitive data applications (for example, barcode scanners, PDAs, laptops accessing files, the Internet, or e-mail services, etc.). As wireless networks deploy newer, latency-sensitive data applications (for example, multimedia intensive applications), the capability to refine and expedite the data transfer arises in order to support latency-sensitive data applications such as voice (for example, Voice over IP ("VoIP")) and video services in a wireless environment. Other examples of latency-sensitive application technologies include cable and satellite transceivers, digital video disc player, and digital video recorders carrying high-definition ("HDTV") signals to televisions or other entertainment devices. For transmission and reception of use Quality of Service mechanisms to sure that the latency-sensitive audio and/or visual data has priority over quality of service Also, various frame transmission methods may be used to effectively increase the data throughput rate between devices, imposing reduced times for response, when required. In latency-insensitive data applications, for example, an acknowledge frame is sent in response to each frame and/or fragment. When the throughput rate is increased, such as in a reduced interframe spacing ("RIFS") mode, the receiving station provides frame acknowledgment through a block acknowledgment frame summarizing the acknowledgments to the received frames.

Fast block acknowledgment generation accommodates increased throughput and differentiation of services increased data throughput for a wireless communications network. The fast block acknowledgment generation also has the capability to accommodate further data throughput enhancements resulting from reduced transmission intervals and/or acknowledgment suppression. Fast block acknowledgment generation is discussed in detail with reference to FIGS. 2 through 10.

Figure 2:
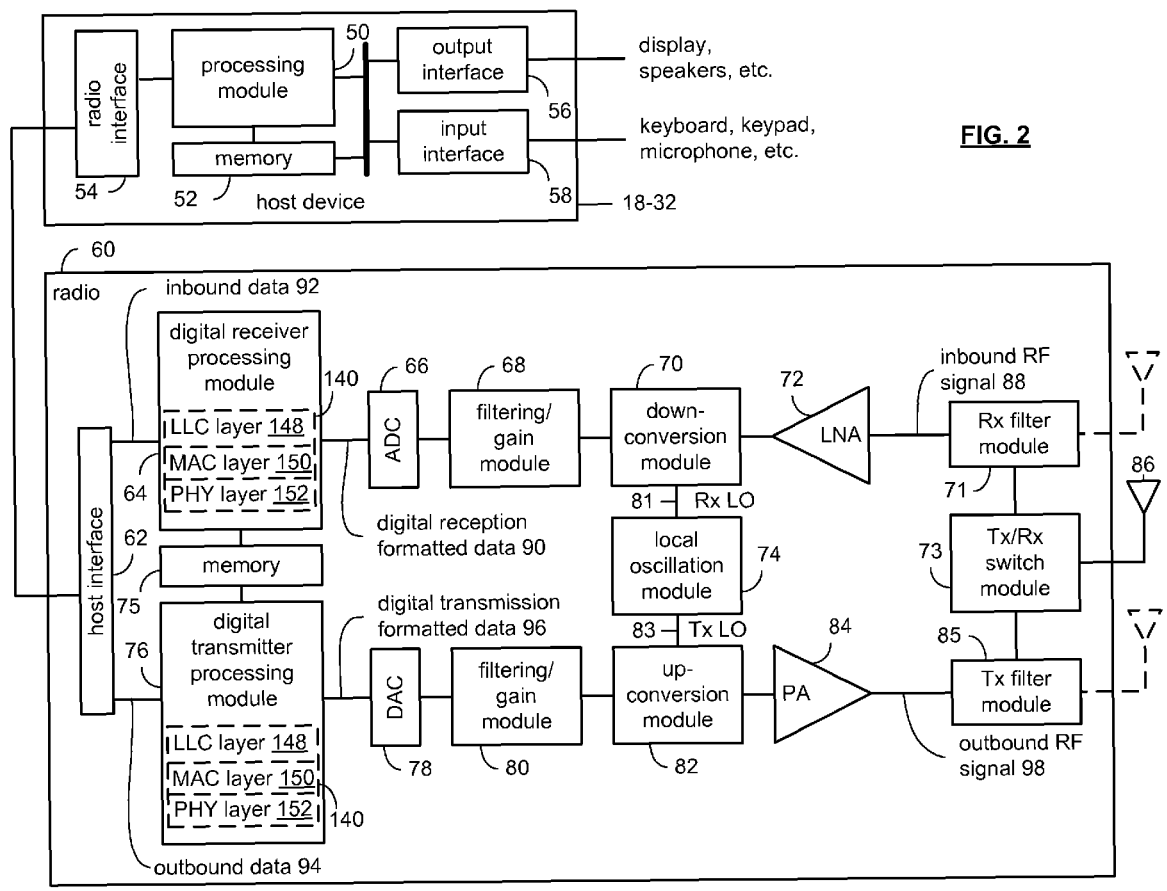
FIG. 2 is a schematic block diagram illustrating a wireless communication host device and an associated radio according to an embodiment of the invention.

FIG. 2 is a schematic block diagram illustrating a wireless communication host device 18-32 and an associated radio 60. For cellular telephone hosts, radio 60 is a built-in component. For personal digital assistants hosts, laptop hosts, and/or personal computer hosts, the radio 60 may be built-in or an externally coupled component.

As illustrated, wireless communication host device 18-32 includes a processing module 50, a memory 52, a radio interface 54, an input interface 58 and an output interface 56. Processing module 50 and memory 52 execute the corresponding instructions that are typically done by the host device. For example, for a cellular telephone host device, processing module 50 performs the corresponding communication functions in accordance with a particular cellular telephone standard.

Radio interface 54 allows data to be received from and sent to radio 60. For data received from radio 60 (for example, inbound data), radio interface 54 provides the data to processing module 50 for further processing and/or routing to output interface 56. Output interface 56 provides connectivity to an output device such as a display, monitor, speakers, etc., such that the received data may be displayed. Radio interface 54 also provides data from processing module 50 to radio 60. Processing module 50 may receive the outbound data from an input device such as a keyboard, keypad, microphone, etc., via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver ("Tx/Rx") switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 coupled as shown. The antenna 86 is shared by the transmit and receive paths as regulated by the Tx/Rx switch module 73. The antenna implementation will depend on the particular standard to which the wireless communication device is compliant.

Digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and modulation. The digital receiver processing module 64 and the digital transmitter processing module 76, in combination with operational instructions stored in memory 75, each implement a protocol stack 140 for providing respective receive and transmitter functionality. The protocol stack 140 is generally based upon the Open Systems Interconnection ("OSI") model, which includes a medium access control ("MAC") layer 150 and a physical ("PHY") layer 152.

The receiving station implements a protocol stack 140, via the digital receiver processing module 64, that includes a MAC layer 150 for providing fast block acknowledgment generation functionality based upon data provided via the PHY layer 152. Implementing a fast block acknowledgment in the MAC layer 150 is discussed in detail with reference to FIGS. 5 through 10.

Digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes, operational instructions corresponding to at least some of the functions illustrated herein.

In operation, radio 60 receives outbound data 94 from wireless communication host device 18-32 via host interface 62. Host interface 62 routes outbound data 94 to digital transmitter processing module 76, which processes outbound data 94 in accordance with a particular wireless communication standard or protocol (for example, IEEE 802.11a, IEEE 802.11b, 802.11g, Bluetooth, etc.) to produce digital transmission formatted data 96. Digital transmission formatted data 96 will be a digital baseband signal or a digital low IF signal, where the low IF typically will be in the frequency range of one hundred kilohertz to a few megahertz.

Digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation 83 provided by local oscillation module 74. Power amplifier 84 amplifies the RF signal to produce an outbound RF signal 98, which is filtered by transmitter filter module 85. The antenna 86 transmits outbound RF signal 98 to a targeted device such as a base station, an access point and/or another wireless communication device.

Radio 60 also receives an inbound RF signal 88 via antenna 86, which was transmitted by a base station, an access point, or another wireless communication device. The antenna 86 provides inbound RF signal 88 to receiver filter module 71 via Tx/Rx switch module 73, where Rx filter module 71 bandpass filters inbound RF signal 88. The Rx filter module 71 provides the filtered RF signal to low noise amplifier 72, which amplifies inbound RF signal 88 to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation 81 provided by local oscillation module 74. Down-conversion module 70 provides the inbound low IF signal or baseband signal to filtering/gain module 68. Filtering/gain module 68 may be implemented in accordance with the teachings of the present invention to filter and/or attenuate the inbound low IF signal or the inbound baseband signal to produce a filtered inbound signal.

Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to the wireless communication host device 18-32 via radio interface 54.

As one of ordinary skill in the art will appreciate, the wireless communication device of FIG. 2 may be implemented using one or more integrated circuits. For example, the host device may be implemented on a first integrated circuit, while digital receiver processing module 64, digital transmitter processing module 76 and memory 75 may be implemented on a second integrated circuit, and the remaining components of radio 60, less antenna 86, may be implemented on a third integrated circuit. As an alternate example, radio 60 may be implemented on a single integrated circuit. As yet another example, processing module 50 of the host device and digital receiver processing module 64 and digital transmitter processing module 76 may be a common processing device implemented on a single integrated circuit.

Memory 52 and memory 75 may be implemented on a single integrated circuit and/or on the same integrated circuit as the common processing modules of processing module 50, digital receiver processing module 64, and digital transmitter processing module 76.

Local oscillation module 74 includes circuitry for adjusting an output frequency of a local oscillation signal provided therefrom. Though it is not shown here in FIG. 2, in an embodiment of the invention, local oscillation module 74 receives a frequency correction input that it uses to adjust an output local oscillation signal to produce a frequency corrected local oscillation signal output. While local oscillation module 74, up-conversion module 82 and down-conversion module 70 are implemented to perform direct conversion between baseband and RF, it is understood that the principles herein may also be applied readily to systems that implement an intermediate frequency conversion step at a low intermediate frequency prior to conversion to a baseband frequency.

Figure 3:
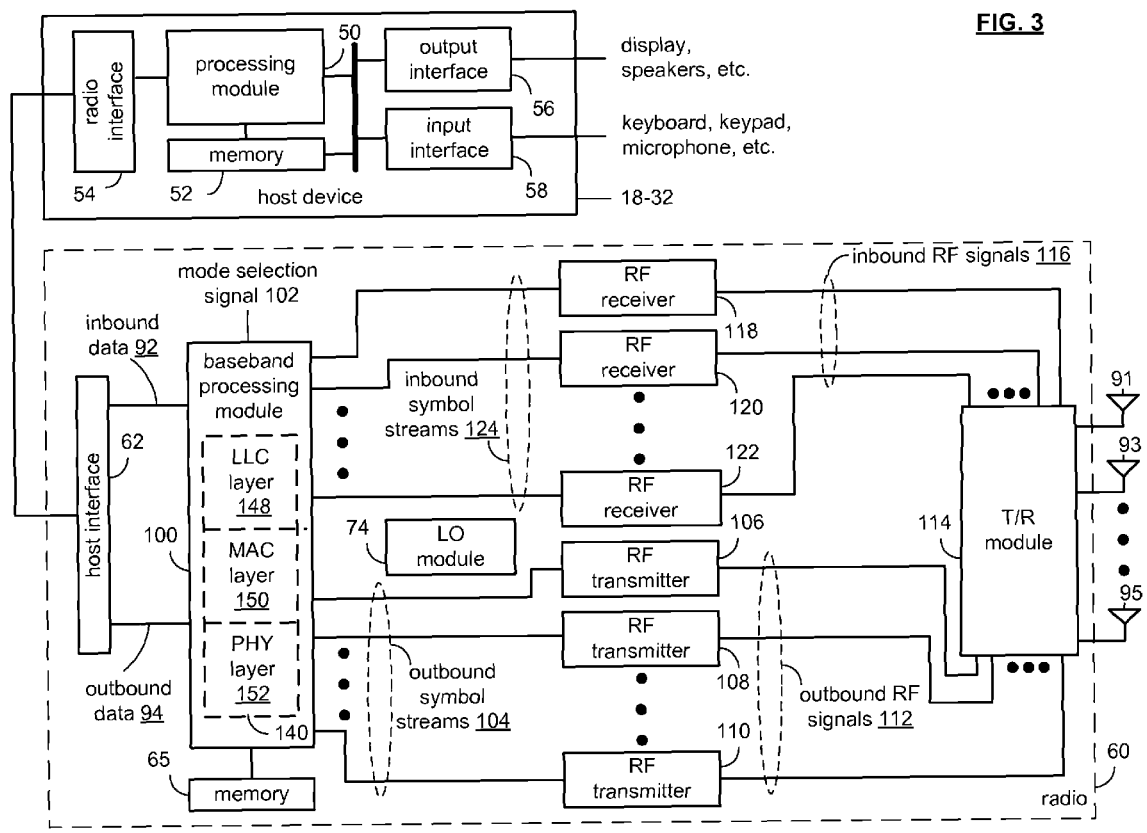
FIG. 3 is a schematic block diagram illustrating a wireless communication device that includes a host device and an associated radio according to another embodiment of the invention.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (for example, inbound data 92), the radio interface 54 provides the data to the processing module 50 for further processing and/or routing to the output interface 56. The output interface 56 provides connectivity to an output display device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency ("RF") transmitters 106-110, a transmit/receive ("T/R") module 114, a plurality of antennas 91-95, a plurality of RF receivers 118-120, and a local oscillation module 74. The baseband processing module 100, in combination with operational instructions stored in memory 65, executes digital receiver functions and digital transmitter functions, respectively.

The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion.

The baseband processing module 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The baseband processing module 100, in combination with operational instructions stored in the memory 65, implement a protocol stack 140, which is generally based upon the Open Systems Interconnection ("OSI") model. The protocol stack 140 includes the logical link control ("LLC") layer 148 and the medium access control ("MAC") layer 150, and a physical ("PHY") layer 152. Through the MAC layer 150 and the PHY layer 152, the radio 60 can receives frames in which it generates a block acknowledgment in response.

In operation, the radio 60 receives outbound data 94 from the host device via the host interface 62. The baseband processing module 100 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal 102 will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode selection signal 102 may also include a code rate, a number of coded bits per subcarrier ("NBPSC"), coded bits per OFDM symbol ("NCBPS"), and/or data bits per OFDM symbol ("NDBPS"). The mode selection signal 102 may also indicate a particular channelization for the corresponding mode that provides a channel number and corresponding center frequency. The mode selection signal 102 may further indicate a power spectral density mask value and a number of antennas to be initially used for a MIMO communication.

The baseband processing module 100, based on the mode selection signal 102, produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode selection signal 102 indicates two, three, or four antennas, the baseband processing module 100 will produce two, three, or four outbound symbol streams 104 from the outbound data 94.

Depending on the number of outbound symbol streams 104 that the baseband processing module 100 produces, a corresponding number of the RF transmitters 106-110 will be enabled to convert the outbound symbol streams 104 into outbound RF signals 112. In general, each of the RF transmitters 106-110 includes a digital filter and upsampling module, a digital-to-analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 91-95.

When the radio 60 is in a receive mode (non-RIFS or RIFS), the transmit/receive module 114 receives one or more inbound radio frequency ("RF") signals 116 via the antennas 91-95 and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of ordinary skill in the art will appreciate, the wireless communication device of FIG. 3 may be implemented using one or more integrated circuits. For example, the host device may be implemented on a first integrated circuit, the baseband processing module 100 and memory 65 may be implemented on a second integrated circuit, and the remaining components of the radio 60, less the antennas 91-95, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
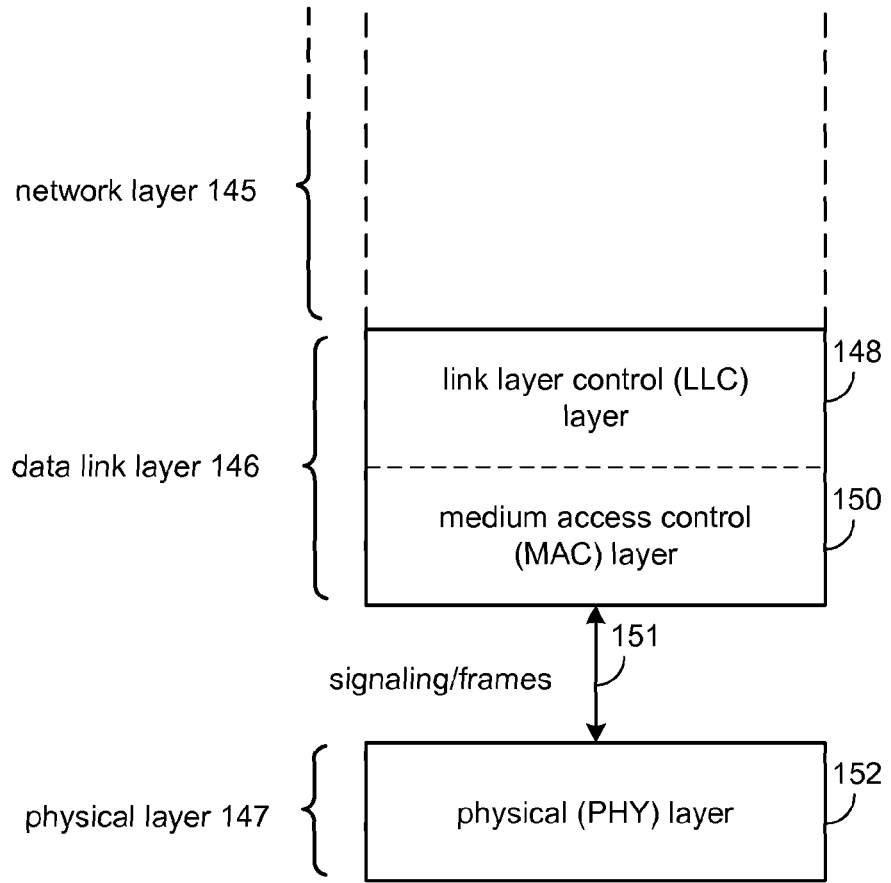
FIG. 4 illustrates a portion of a protocol stack deployed in a radio 60 according to an embodiment of the present invention.

FIG. 4 illustrates a portion of a protocol stack 140, based upon the OSI model. The radio 60 implements the protocol stack 140 via the digital receiver processing module 64 and the digital transmitter processing module 76 (see FIG. 2) and/or via the baseband processing module 100 (see FIG. 3). In general, the protocol stack 140 includes protocol layers, each with a defined set of functions and operations under applicable wireless standards specifications.

The protocol stack 140 includes a physical layer 147, a data link layer 146, and a network layer 145. The protocol stack 140 includes layers higher than the network layer, such as the transport layer and the application layer (as indicated by the dashed lines), but for clarity are not discussed further herein. The physical layer 147 includes a physical ("PHY") layer 152 having a Physical Layer Convergence Procedure ("PLCP") sub-layer 154 and a Physical Medium Dependent ("PMD") sub-layer 156. The PHY layer 152 may be referred to in the general sense, but is to be understood to include the PLCP sub-layer 154 and the PMD sub-layer 156. The data link layer includes a link layer control ("LLC") layer 148 and a medium access control ("MAC") layer 150.

For latency-sensitive data applications in a wireless LAN, the IEEE 802.11e specification provides Quality of Service mechanisms in the MAC layer. The MAC layer implements the bitmap generation functionality, which is described in detail with reference to FIGS. 6 through 10. The MAC layer 150 and the PHY layer 152 interact via the signaling/frames 151 communications. When the radio 60 provides this interaction, based upon the IEEE 802.11e specification, the radio is also referred to as a QoS-capable station ("QSTA").

The PHY layer 152 provides wireless receiving functions (for example, descrambling, decoding, deinterleaving, symbol demapping and demodulation, et cetera) for the MAC layer 150, in accordance with the control and/or configuration signals via signaling/frames 151. The PHY layer 152 also supports secondary functions such as assessing the state of the wireless channel and reporting this status to the MAC layer 150. The PLCP sub-layer 154 is, in effect, a handshaking layer that enables MAC protocol data units (MPDUs) to be transferred (via data octets) between MAC layer 150 and the PMD sub-layer 156. The PMD sub-layer 156 provides a wireless reception service function (to receive inbound digital signals, or a raw bit stream, from the radio front end circuitry) that is interfaced to the MAC layer 150 via the PLCP sub-layer 154. As one of ordinary skill in the art may appreciate, the PLCP and PMD sub-layers may vary based upon specific wireless LAN specifications.

The MAC layer 150 operations include, without limitation, station connectivity regarding the selection and communication with other stations, including access points, and wireless LAN frame formats. The MAC layer 150 functions include, without limitation, channel allocation procedures, protocol data unit ("PDU") addressing, frame formatting, error checking, and fragmentation and reassembly.

The LLC layer 148 operates to provide a standard interface and signal format and protocol between the various kinds of 802 networks to the network layer 145. This format, interface, and protocol are based upon the high-level data link control ("HDLC") protocol. The LLC layer 148 forms the upper portion of the data link layer 146. In operation, the network layer 145 uses LLC access primitives to pass a packet to the LLC layer 148. The LLC layer 148 adds an LLC header, containing sequence and acknowledgment numbers, which is passed to the MAC layer 150.

The MAC layer 150 and the PHY layer 152 may be implemented by a digital receiver processing module 64, a digital transmitter processing module 76 and operational instructions stored in a memory 75 (see FIG. 2) and/or in a baseband processing module 100 (see FIG. 3). The processing modules 76 and 100 may be implemented in logic, in operation instructions via software, or a combination of technologies to accommodate critical timing, non-critical timing, and/or response requirements of the MAC layer 150 and the PHY layer 152, as well as those of the radio 60 in general.

As an example, timing-critical requirements for the MAC layer 150 include those functions demanding fast responses or precision timing, such as cyclical redundancy code ("CRC") generation and checking, hardware-level frame retry, channel access, timer updates, and generation of special frames such as beacons, ACK (acknowledgment), CTS (clear-to-send), et cetera. With respect to the MAC layer 150, software operational instructions may prompt the processing module (such as receiver processing module 64 and/or baseband processing module 100) to support non-timing critical functions. Examples of non-timing critical requirements, within the MAC layer 150, include functions such as complex frame exchanges (for example, authentication and association exchanges), fragmentation, frame buffering and bridging, et cetera. Accordingly, the layers may be implemented as a combination of logic and memory storage configured to carry out the task of the layer (that is, while data is in the digital domain).

The functional logic may be hardware, software, firmware, or a combination thereof, implemented using application specific integrated circuits ("ASIC") or systems-on-chips (where variations may include gate array ASIC design, full-custom ASIC design, structured ASIC design, et cetera), application specific standard products ("ASSP"), programmable gate array ("PGA") technologies (such as system programmable gate arrays ("SPGA"), field programmable gate arrays ("FPGA")), et cetera. Also, each medium, or a combination of all or portions of the mediums, may be implemented as an integrated circuit or software program (including drivers) to accommodate timing and/or processing requirements, providing for RIFS receive mode operation as well as other operational modes that are non-RIFS, such as those wireless communications specifications providing a distributed coordinated function and point coordinated function operations.

Figure 5:
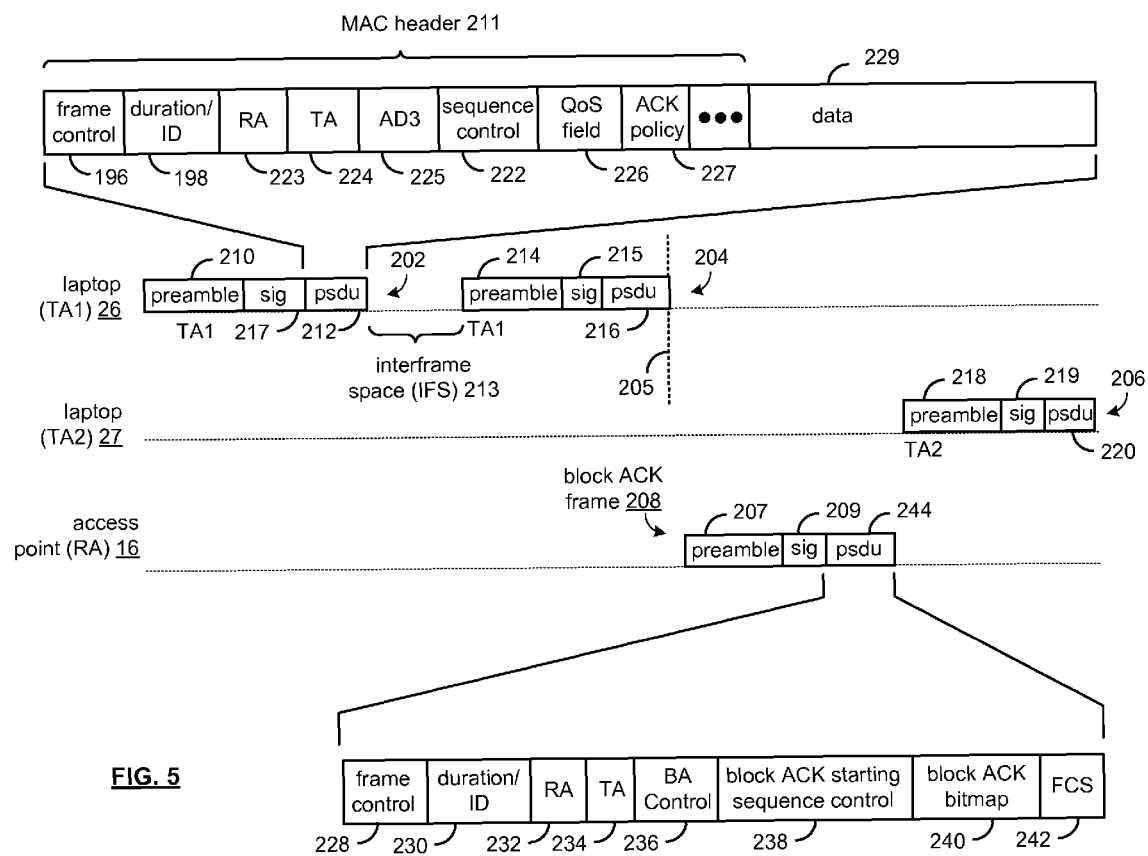
FIG. 5 illustrates a method for receiving frames and/or fragments in a wireless communication network with latency-sensitive data capability according to an embodiment of the invention.

FIG. 5 illustrates a method for receiving frames and/or frame fragments in a wireless communication network for latency-sensitive data applications according to an embodiment of the invention.

As an example, the laptop 26 and the access point 16 (see FIG. 1) engage in the exchange of frames (that may also be referred to as packets) that are generated by a latency-sensitive application (for example, Voice over IP ("VoIP"), multimedia sessions, et cetera), that require higher quality-of-service requirements over other frames. Before beginning data transmission, upon entry into the basic service set 06, the laptop 26 notes that the access point 16 is a QoS-capable station ("QSTA") via information distributed by the access point 16 within beacon frames which are transmitted at a generally periodic rate, or via probe response frames which are transmitted by the access point 16 as a response to probe request frames transmitted by other STA or QSTA.

In order to improve transmission efficiency, a QSTA and the access point 16 create a block acknowledgement agreement for the packets. These packets are to be generated by a latency-sensitive application via a block acknowledgement "agreement" protocol. The block acknowledgment agreement may be conducted through the exchange of appropriate management frames as designated by an applicable standard specification (for example, IEEE 802.11e Block ACK Management Action frames).

Following the information exchange indicating the QSTA-capable devices within a basic service set 06 (or for further example, within an IBSS 08 and/or an Extended Service Set), the laptop 26 stores information representing that the access point 16 has block acknowledgment capability and/or is a QSTA. Also, the access point 16 notes that the laptop 26 is block acknowledgement capable and/or is a QSTA. Laptop 27 performs, for example, similar steps, similarly establishing a communications path with the access point 16 and similarly establishing a block acknowledgement agreement with the access point 16.

In operation, a receiving QSTA (such as access point 16) generates and sends a block ACK frame 208 to the transmitting QSTA following the end of transmission 205. The block acknowledgment may be initiated upon the request of the QSTA, either explicitly through a block ACK request frame (such as the frame 204) or implicitly through specific indication within the ACK policy field of the frames sent in the group preceding and including frame 204, which, for example, may contain multiple sub-frames in an aggregated frame format. Alternatively, the block ACK request frame may appear in a separate transmission opportunity ("TXOP") as defined under the applicable wireless specification, in which case, the receiving QSTA (or access point) sends a block ACK frame to the transmitting QSTA (or access point) within an IFS following the transmission of the explicit block ACK request frame, or within yet another separate TXOP.

After the initial QoS capability determination between stations (or subsequent updates as stations enter and/or leave the basic service set 06), the laptop 26 (serving in this example as a transmitting station) sends to the access point 16 a frame 202. The frame 202 includes a preamble 210, signal field 217 and PSDU ("PHY Service Data Unit") 212. A PSDU is formed by the MAC layer, and includes a MAC header 211 and data 229. The MAC layer header 211 of frame 202 includes a frame control field 196, a duration/ID field 198, a receiver address (RA) field 223, a transmitter address (TA) field 224, an address3 field 225, sequence control field 222, a QoS field 226, which includes a Block ACK subfield, and ACK policy field 227. The frame control 196, duration/ID field 198, receiver address 223, transmitter address 224, address 3 field 225, and sequence control field 222 form a minimal frame format under the IEEE 802.11 specification, and are generally present in all frames conforming to that specification.

The preamble 210 includes preamble training sequences used for receiver synchronization process, such as short training symbols, long training symbols, and at least one signal field. The short training symbols are used to detect the start-of-frame, perform gain control sequence (to place the signal in a range suitable for detection), determine and correct for carrier frequency offset, assist in symbol recovery, et cetera. The long training symbols provide information for channel estimation and fine improvements to receiver performance. The signal field 213 (which may also be referred to as a PHY Layer Convergence Procedure ("PLCP") or a PHY header) contains information to carry out processing and decoding of the PSDU 212 of the frame 202.

The sequence control field 222 includes a sequence number subfield and a fragment number subfield. Each frame has a sequence number, which is constant for that frame. This value is typically sequentially incremented by one for subsequent frames from the QSTA. The fragment number subfield is assigned to each fragment of a frame. In general, the first fragment is assigned to zero and subsequent fragments are typically sequentially incremented. The transmitter address field 224 is the MAC address of the station that transmits the frame to the wireless channel. The receiver address 223 is the MAC address of the station that is the intended recipient of the frame.

The QoS field 226 indicates the data classification, or traffic classification, or traffic stream identification for the PSDU portion 212. Typically, four different types of traffic are considered, namely, voice, video, video probe and data. Voice, video and video probe traffic is assumed to occur at a constant bit rate. Data traffic is often sent at non-constant bit rates, usually in bursty fashion. An example of data traffic is that which is generated by the file transfer protocol ("FTP"). Based upon the classification of the data, a transmitting station, such as access point 16, differentiates and prioritizes the data for transmission to a receiving station, such as laptop 26.

The ACK policy field 227, which may be part of a QoS control field under an applicable wireless specification such as IEEE 802.11e, identifies the acknowledgment policy that the laptop 26 follows upon receipt of the frame, which in this example is frame 202. The contemplated acknowledgment policies are "normal acknowledgment," where the laptop 26 responds with an acknowledgment following each received frame, "no acknowledgment," "no explicit acknowledgment," and "block acknowledgment." Alternative interpretations of the encodings of this field are possible, including one in which "normal acknowledgement" may be interpreted, for example, in an aggregated context, to mean block acknowledgement without the requirement of the transmission of an explicit block acknowledgement request frame.

When the ACK policy field 227 indicates "block acknowledgment" is to be used for the transmission, the access point 16 will use a single block acknowledge message to signal that multiple packets have been received, as opposed to using one acknowledge message for each frame it receives (as in a "normal acknowledgment" mode). The block acknowledge mechanism substantially increases the network throughput for traffic streams that frequently give rise to the condition of a transmit queue containing more than one frame or fragment ready for transmission at one time by reducing the amount of overhead otherwise associated with the normal acknowledgment process.

For a burst transmission of data packets, the access point 16 receives frame 202 and frame 204, which also includes a preamble 214, a signal field 215, and PSDU 216. After receiving frame 202, the receiver module of access point 16 updates a bitmap that corresponds to the block acknowledgement agreement identified by the combination of the receiver address value 223, the transmitter address value 224, and the QoS field 226. The bitmap indicates the status of received frames in relation to the frame sequence numbers.

Following the frame 202 is an interframe space (IFS) 213. After the subsequent frame 204, which the receiver module also updates a bitmap indicating receipt of the frame, the access point 16 prepares a block ACK frame 208 for transmission to the laptop 26.

The block ACK frame 208 contains information about the reception of the whole block of received frames through a corresponding bitmap. The bitmap can be transmitted after a request by the transmitting station (such as by a control frame called a block ACK request), or without a block ACK request if the context is an aggregated set of frames employing the "normal acknowledgement" ACK policy setting to effectively convey a request for block acknowledgement.

Alternatively, the laptop 26 may transmit the block ACK request during a later transmission opportunity and the access point 16 may subsequently transmit the block ACK frame 208 on a first transmission opportunity (TXOP) basis.

As the receiving station, the access point 16 generates the block ACK frame 208, which includes a preamble 207, a signal field 209, a PSDU 224. The PSDU 224 includes a frame control field 228, a duration/ID field 230, a receiver address (RA) 232, a transmitter address (TA) field 234, a block acknowledge control field 236, a block ACK starting sequence control 238, a block ACK bitmap 240, and a frame check sequence (FCS) field 242. The frame control 228, duration/ID field 230, receiver address 232, and last field, frame check sequence 242, constitute a minimal frame format under the IEEE 802.11 specification, and are generally present in all frames conforming to that specification.

The RA field 232 includes the address of the receiving station, which in the present example is laptop 26. The TA field 234 includes the address of the transmitting station, which in the present example is access point 16. The block acknowledgement control field 236 is used to specify the QoS identifier of the associated block acknowledgement agreement to which the block acknowledgement bitmap corresponds. The TA field 234 is used with the QoS identifier from the block acknowledgement control field 236 to further identify the specific associated block acknowledgement agreement to which the block acknowledgement bitmap corresponds.

The block ACK starting sequence control field 238 is the sequence number of the first frame of the associated block acknowledgement agreement for which the block ACK frame 208 is sent. The block ACK bitmap, which indicates the receive status of the frames, may accommodate, under the IEEE 802.11e specification the receive status of up to sixty-four frames. Generation of the block ACK bitmap 240 is discussed in detail with respect to FIGS. 6 through 10.

The block ACK frame 208 is used to signal that multiple packets have been received, as opposed to using multiple ACK messages that correspond to each packet, as in non-802.11e processes. The block ACK mechanism can significantly increase the data throughput for traffic streams that frequently give rise to the condition of a transmit queue containing more than one frame or fragment ready for transmission at one time by reducing the amount of overhead otherwise present with single frame/single acknowledgment data transfer protocols. The data throughput, however, then is affected by the efficiency and rate in which the block ACK mechanism can track and generate a block acknowledgment.

Following receipt of the block ACK frame 208, the access point 16 may retransmit frames which have not yet been indicated in a received block ACK bitmap as having been received, either in another plurality of frames or in individual frames.

The access point 16 may also receive a frame from other transmitting addresses. For example, transmitting station laptop 27 (having a transmitter address TA2) transmits the frame 206, which includes a preamble 218, a signal field 219, and a PSDU 220.

As may be appreciated, other transmission formats may be used in the wireless transmission. For example, the access point 16 may transmit multiple frames using an aggregated frame structure that includes a single preamble and multiple signal fields corresponding to multiple PSDU payloads. The signal fields include information (such as modulation coding, number of frames, frame boundaries, et cetera) that the receiving station uses to decode a PSDU payload. Accordingly, the aggregated frame structure omits an interframe space and subsequent preamble. The receiving station accesses the next signal field to decode the respective PSDU payload.

In an alternative aggregation technique, the aggregated frame structure includes a single preamble and a single signal field with multiple MAC layer headers and multiple MAC layer frames. In this case, the signal field includes information (such as modulation and coding and length of the entire aggregate) that the receiving station uses to decode a PSDU payload. The multiple MAC layer headers further describe the frame boundaries and optionally, the number of frames. Accordingly, the aggregated frame structure omits an interframe space and subsequent preamble otherwise required for individual ACK frame transmissions. The aggregated frame may include either a block ACK request frame or a specific indication within the ACK policy field, or no request for a Block ACK. In either the block ACK request frame or the specific indication, the receiving QSTA (such as the access point 16) is requested to respond with a block ACK frame to the transmitting QSTA (such as laptop 26) within an interframe space (IFS) following the last reception. The frame 204 of FIG. 5, for example, can be an aggregated frame that contains multiple frames, in which each of the frames has a MAC header and corresponding sequence number.

Further, as one of ordinary skill in the art may appreciate, frames containing data fields, such as frames 202, 204, and 206, may also be in the form of frame fragments. In general, the longer a transmission lasts, the greater the probability of interference corrupting the transmission. Depending upon the wireless medium environment, an aggregated frame format or standard frame format may not be tolerable according to the rules of the protocol because of the associated transmission duration. Accordingly, a transmitting station my divide a frame into shorter fragments to reduce the likelihood of interference based upon a fragmentation threshold, which specifies that frames exceeding a specified size can be divided into multiple transmissions with respective sequence numbers.

The frames 202 and 204 are examples in which a block ACK is requested. Generally, frame 202 would be a data frame requiring acknowledgement, and the frame 204 would be a block ACK request frame. Additional data frames requiring acknowledgement may have been transmitted prior to the transmission of frame 202.

Alternatively, frame 202 may also be a frame that does not require acknowledgement. For example, frame 202 may be a control frame, and frame 204 is an aggregated frame that contains multiple frames, each of which contains a MAC header with a frame sequence number, and each requiring acknowledgement. The aggregated frame 204 would request a block ACK acknowledgement implicitly through specific indication within the ACK policy field of the individual MAC headers of the frames within frame 204.

In response to the request for a block ACK, the access point 16 provides fast block acknowledgment generation at a rate sufficient to accommodate the data throughput rate of the frames 202 and 204. Otherwise, the acknowledgment generation process either may provide erroneous data, or negatively impact the advantages otherwise associated with use of block acknowledgment for time-sensitive data applications. Under the IEEE 802.11e specification, the access point 16 transmits the block ACK frame 208 to the laptop 26 by request of the laptop 26.

Notably, though, as the frame transmission rate increases, the radio 60 of access point 16 needs to employ fast block acknowledgment generation to avoid impeding or otherwise negatively impacting the advantages associated with increased data throughput, and correspondingly, affecting delay-sensitive data applications. Fast block acknowledgment generation is discussed in detail with reference to FIGS. 6 through 10.

Figure 6:
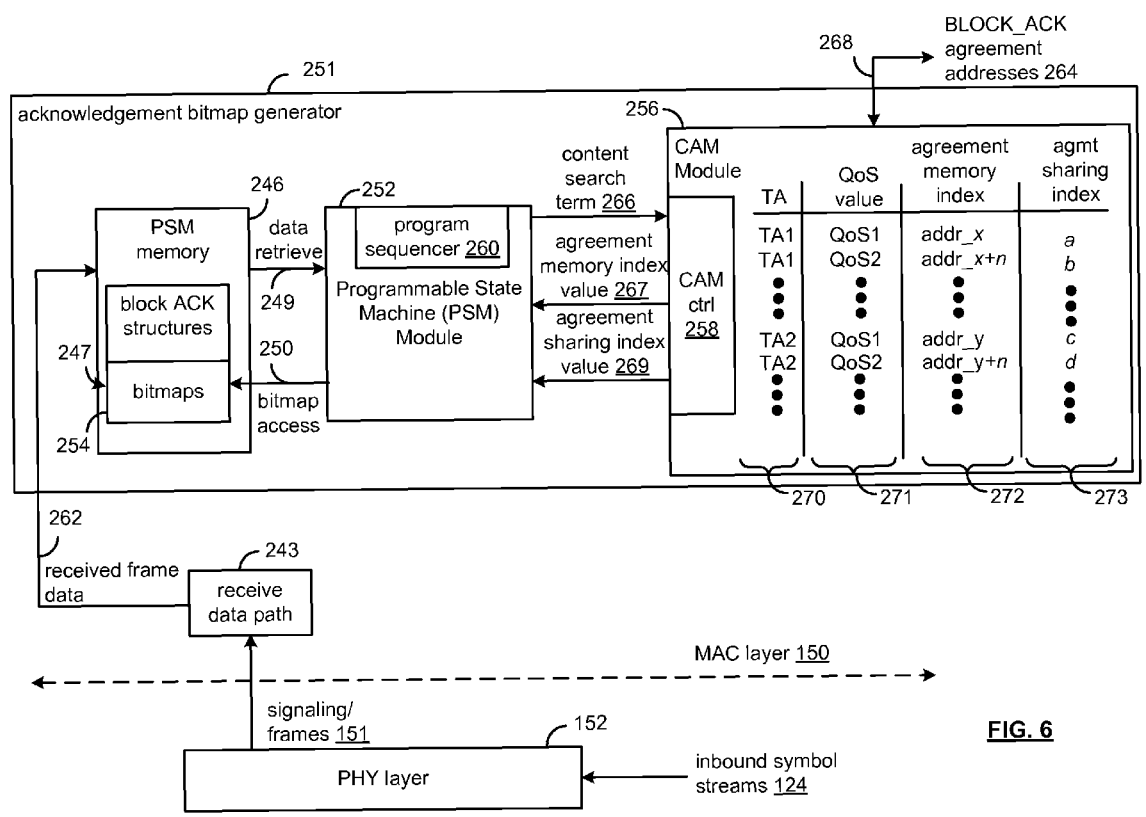
FIG. 6 is a block diagram illustrating a bitmap generator of a receiving station of a wireless communication network according to an embodiment of the invention.

FIG. 6 is a block diagram illustrating an acknowledgement bitmap generator 251 of a receiving station, the acknowledgment bitmap generator 251 including a programmable state machine (PSM) module 252, a PSM memory 246, and a content addressable memory (CAM) module 256. The PSM module 252 includes a program sequencer 260. The PSM memory 246 includes a block acknowledgement (ACK) structure 247 with a plurality of bitmaps 254. The CAM module 256 includes a CAM control module 258. The acknowledgement bitmap generator 251 functionality is provided through the MAC layer 150 of a receiving station, such as the access point 16 in the example of FIG. 5.

The acknowledgement bitmap generator 251 provides the fast block acknowledgment generation to sustain increased data throughput for a wireless network.

In FIG. 6, the CAM module 256 is a data array, which includes at least one transmitter address (TA) 270, Quality of Service (QoS) value 271, and a corresponding agreement memory index value 272. In the present example, the agreement memory index values 272 are separated by a value of "n" (for example, where n has a value of 1, 2, or other suitable values). The data array for the CAM module 256 further includes an agreement sharing index value 273 that is mapped to the TA and QoS value.

In support of fast block acknowledgment generation, the CAM module 256 is operable to perform concurrent searches to expedite the retrieval of the corresponding agreement memory index value 272 and agreement sharing index values 273. That is, CAM module 256 has the ability to search its entire memory, in a minimum of clock cycles, to determine whether it contains a content search term from the PSM module 252.

To provide concurrent search capability, each memory bit in a fully-parallel CAM module has an associated comparison circuitry for detecting matches between the stored bits and the input bits of the search term. Additionally, the CAM module combines the matched outputs from each cell in the data word and issues a "complete data word match" signal via the CAM control 258. The CAM control 258 may be implemented according to a suitable interface specification, for example, the Look-Aside Interface (LA-1, LA-1B, et cetera.). The CAM module 258 may be implemented as a binary CAM, where the content search terms are based upon a binary search basis, a ternary CAM that permits matching state of "X" or "Don't Care" for one or more bits in a pre-stored to add flexibility to the search, or other suitable architecture. The CAM may be implemented as a serial read-and-compare operation on an otherwise normal block of memory.

The baseband processing module or software driver of a wireless communication device populates the contents of the CAM module 256 using information from block acknowledgement (BLOCK_ACK) agreement (or agreements) that have been "negotiated" between this device and other wireless communications devices. Each BLOCK_ACK agreement is uniquely identified by a TA and QOS value pair. Under the IEEE 802.11e specification, for example, a QOS value may be up sixteen values. The baseband processing module or software driver additionally assigns an agreement memory index value and an agreement sharing index value to each BLOCK_ACK agreement. Each agreement sharing index 273 may be unique over all TA and QoS value pairs, but is at least unique among all TA and QoS value pairs that share a single memory index 272. Each value of the agreement memory index 272 may be unique, or any given value of the agreement memory index 272 may be shared by more than one distinct TA and QoS value pair. For each unique BLOCK_ACK agreement, the corresponding TA and QOS value pair, values for agreement memory index 272 and agreement sharing index 273 are entered into one entry of the CAM module 256.

In this manner, the CAM module 256 contains pre-stored transmitter addresses and QoS values from the BLOCK_ACK agreement, and agreement memory index values, and agreement sharing index values for each of the possible transmitters that could be transmitting frames under a block ACK agreement to this device within a wireless network, such as the BSS 06.

In other words, the baseband processing module for a receiving station will not generate a block acknowledgment frame unless there has been a block acknowledgment agreement with a transmitter address, and the CAM module 256 correspondingly will not contain an entry for that transmitter address.

In operation, the PHY layer 152 receives inbound symbol streams 124 and produces the signaling/frames 151, via primitives (that is, basic data blocks set out under the applicable specification and/or programming language), to the receive data path 243 of the MAC layer 150. The receive data path of the MAC layer 150 performs operations that include but are not limited to, analyzing the MAC header 211 to determine what subsequent MAC operations should be performed, checking the MAC header receive address and verifying the validity of the MAC data with an FCS calculation. The PHY layer 152 includes appropriate circuitry to compensate for analog impairments and channel variations the wireless channel imposes upon the frame during transmission, including, but not limited to, sampling frequency offset, common phase error, which results from phase rotation of the received symbols, phase noise and/or carrier frequency offset.

With respect to the bitmap generator 251, the radio 60 stores data from the received frame in the PSM memory 246, the data including the transmitter address, a quality of service value, a sequence number, and an ACK policy from the appropriate fields of the received frame (see FIG. 5). The PSM module 252, according to operational instructions executed in an order set out by the program sequencer 260, examines the ACK policy field and the frame type and subtype fields of the received frame via the data retrieve 249 to determine whether the transmitter associated with the transmitting address requests a block acknowledgment for the frames being received by the radio 60. When a block acknowledgment is requested the PSM module 252 retrieves the transmitter address and the QoS value from the PSM memory 246, via the data retrieve 249, and supplies content search terms 266 to the CAM module 256, the content search terms 266 including the transmitter address and the QoS value for the received frame.

The CAM module 256 conducts a concurrent search for a match to the transmitter address and QoS value to rapidly retrieve a corresponding agreement memory index value 267 and an agreement sharing index value 269. The retrieved agreement memory index value 267 is an address, or part of an address, (such as for the instance of TA1 and QoS1 is addr_x) into the memory that contains the block ACK structure and corresponding bitmap of the plurality of block ACK structures and their associated bitmaps 254. The agreement memory index value 267 is used to identify a unique bitmap structure within the bitmap memory.

The agreement sharing index value 269, retrieved from the agreement sharing index 273, is returned with the agreement memory index value 267 to the PSM module 252. The PSM module 252 uses the retrieved agreement sharing index value 269 to further determine whether a matching bitmap 254 in the PSM memory 246 has been located when a bitmap memory location is shared between different block acknowledgement agreements. A matching bitmap is located when the retrieved agreement sharing index value 269 matches the stored bitmap sharing identifier 276 (see FIG. 7) from the indicated bitmap. If the stored bitmap sharing identifier 276 does not match the retrieved agreement sharing index value 269, then there is no bitmap currently stored for the indicated BLOCK_ACK agreement. When a matching bitmap has been located in this manner, the bitmap information is used to create the requested block ACK frame bitmap.

The CAM module 256 search takes a number of clock cycles to execute, depending on the size and depth of the CAM module 256. A suitable size for the CAM module accommodates at least 64 transmitter entries; however, larger sizes may be used, taking into consideration the added complexity and clock cycle time for accessing the contents within a sufficiently expedited retrieval rate from the CAM module 256. The CAM control 258 indicates the search is complete to the PSM module 252, and provides the agreement memory index value 267 and agreement sharing index value 269 to the PSM module 252.

The PSM module 252, according to operational instructions executed in an order set out by the program sequencer 260, examines the ACK policy field and the frame type and subtype fields of each received frame via the data retrieve 249 to determine whether the transmitter associated with the transmitting address requests a block acknowledgment for the frame being received by the radio 60, and whether the block acknowledgement is required immediately or will be required at a later time. When a block acknowledgment is not required immediately, the PSM module 252 retrieves the transmitter address and the QoS value for the current frame from the PSM memory 246, via the data retrieve 249, and supplies content search terms 266 to the CAM module 256. The content search term 266 includes the transmitter address and the QoS value for the received frame.

The PSM module 252 then accesses a bitmap of the block ACK structure 247, via the bitmap access 250, based upon the retrieved agreement memory index value 267. The bitmap access by the PSM module 252 serves to retrieve a bitmap structure into which the acknowledgement state for the received frame and of subsequently received frames to be maintained. Having accessed the block ACK structure 247, the PSM 252 stores the acknowledgment state for the received frame by examining the offset of the received frame's sequence number from the value of the sequence number retrieved from the bitmap, when the retrieved agreement sharing index value 269 matches the bitmap sharing identifier value 276, which is stored in the associated block acknowledgement structure 247, as is discussed in detail with respect to FIG. 7.

As a subsequent frame is processed, the PSM module 252 stores the acknowledgment state for the subsequent frame with respect to the transmitter address, QoS value, and sequence number of the subsequent frame.

A bitmap 254, which is mapped in relation to a transmitter address and QoS value, may be cleared by the PSM module 252 when no unused entries in the set of block acknowledgement structures remains and no used entry in the set of block acknowledgement structures corresponds to the TA and QoS value pair and sharing identifier 276 of a newly-arrived frame, which is a frame that requires a block acknowledgement per an outstanding block acknowledgement agreement.

As a further example, the PSM module 252 provides the TA and QoS value of the received frame as content search terms for the CAM module 256, and notes whether the CAM-provided bitmap sharing index value 269 matches the sharing identifier 276 retrieved from the bitmap as located through the CAM-provided agreement memory index value 267. If the agreement sharing index value 269 does not match the bitmap sharing identifier 276, then a new frame sequence is present, and as such, the block acknowledgement structure at the location corresponding to the agreement memory index value 267 in the set of block acknowledgement structures is cleared accordingly. The PSM module 252 then sets a bit in the bitmap to correspond to the newly-arrived frame. The set bit indicates a first frame of a frame sequence has been received, while the remaining bits are cleared, or reinitialized, in preparation for subsequently received frames. The PSM module 252 writes the agreement sharing index value 269 that corresponds to the BLOCK_ACK agreement which corresponds to the received frame to the sharing identifier location 276 in the block acknowledgement structure. Correspondence of the received frame and a BLOCK_ACK agreement is established through a matching value of TA and QOS pair.

As another technique for accessing the bitmap associated with a given transmitter address, the PSM module 252 retrieves the agreement memory index value 267 from the CAM module 256 based on a content search term 266 containing only the transmitter address (TA). By combining the agreement memory index value 267 with the QoS value of the received frame, the PSM module 252 can locate the block acknowledgement structure and associated bitmap relating to the transmitter address within the set of block acknowledgement structures corresponding to the transmitter address TA. In this regard, the QoS value information can be removed from the table structure of the CAM module 256, thus decreasing the CAM device complexity, which further increases the efficiency of the acknowledgment bitmap generator 251. Upon locating the block acknowledgment structure 247 and associated bitmap 254, the PSM module 252 stores the acknowledgment state for the received frame at the offset from the start of the respective bitmap as indexed by the sequence number of the received frame, provided that the CAM-provided agreement sharing index value 269 matches the sharing identifier 276 of the block acknowledgement structure at that offset.

Figure 7:
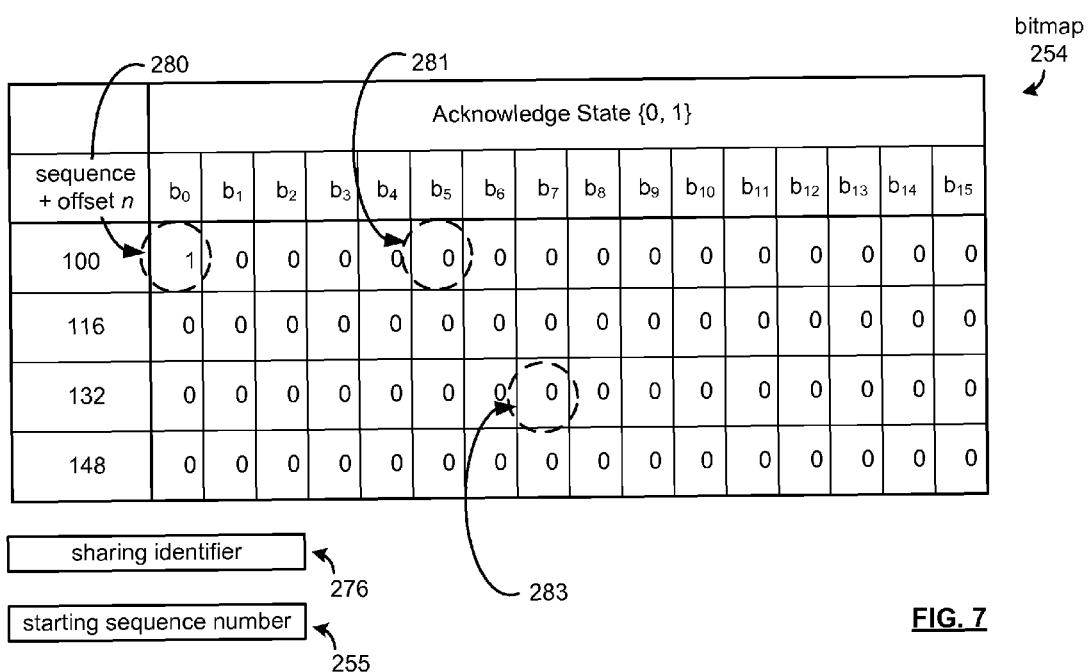
FIG. 7 is illustrates a bitmap of the block ACK structure of FIG. 6.

FIG. 7 illustrates a bitmap 254 of the block ACK structure 247 of FIG. 6. The bitmap 254 is shown in a cleared state, except for the bit 280 representing the lowest sequence number in the bitmap. That is, the PSM module 252 clears or resets the acknowledge states for the sequence number positions upon a predetermined occurrence, for example, clearing all acknowledge states to "unacknowledged" when a block ACK agreement is initially created for a specific transmitter address and QoS value pair. The sharing identifier 276 in the cleared state is set to NULL. The starting sequence number 255 contains the sequence number for the first bit 280 of the bitmap 254.

In the cleared state, the bits of the bitmap are reset, or cleared, to indicate the frames with sequence numbers that are yet to be received. For example, the bitmap generator 251 clears the bit 280, which relates to the acknowledgement status of the frame. The bit 280 is the sequence number corresponding to the stored starting sequence number 255 (for example, having a sequence number value of "100") for this bitmap. The bitmap generator 251 clears the location at bit 281, which relates to the acknowledgement status of the frame that includes a sequence number corresponding to the stored starting sequence number that is, "100" plus five bit positions for this bitmap.

As another example, bit 283 in the bitmap 254 corresponds to the stored starting sequence number plus two times "16+7,"

resulting in a sequence number value of "139," and the starting sequence number 255 has the value of "100."

The acknowledgment state of a received frame is indicated by a bit position offset by n of the bitmap 254. If the bit with offset n from the start of the bitmap is set to a "1," then this indicates that this station has successfully received a frame with the sequence number equal to the block acknowledgement structure stored as the starting sequence value 255 plus n. If the value of the bit in the position with offset n from the start of the bitmap remains "0," indicating that the receiving station has not successfully received a frame with sequence control value equal to the block acknowledgement structure stored starting sequence value plus n.

In operation, a block acknowledgement structure associated with a transmitter address and QoS value may be cleared upon certain conditions. These conditions generally indicate that the block acknowledgement structure is being shared among multiple TA and QoS value pairs, and that a frame with one of the other TA and QoS value pairs has been received. It should be noted that the capability exists where a receiving station may track the receipt of various Quality of Service values for a plurality of frames having the same transmitter address, and send a plurality of bitmaps following the receipt of a plurality of frames.

The bitmap generator 251 may adjust the bitmap 254 to accommodate a transmitting station by shifting the bitmap indices to reflect a present bitmap starting sequence number when the received sequence number of a frame is greater than the highest sequence number available in a bitmap associated with the transmitter address and the QoS value of that frame.

For example, the bitmap 254 has a bitmap length of sixty-four bits, and an initial bit in the bitmap representing the status for the frame with sequence number of "100." When the receiving station receives a subsequent frame having a sequence number of "172" that exceeds the sixty-four bits of the bitmap 254. Also received from the subsequent frame is a TA and a QoS value that correspond to a particular block acknowledgement structure 247 and an agreement sharing index value 269 that match the sharing identifier 276 for the block acknowledgement structure 254.

To accommodate the sequence number of "172" for a received subsequent frame, the PSM module 252 performs an arithmetic shift "left" of nine bit positions. As a result, the starting sequence number 255 for the bitmap after the shift operation has a value of "109," and the bits in the bitmap that correspond to the sequence numbers from "163" through "171" are "0"-filled. Also, the bit corresponding to the bitmap location for sequence number 172 is set to "1" to indicate that the subsequent frame has been received.

Stated differently, the PSM module 252 shifts the bits of the bitmap according to a difference between the subsequent received sequence number ("RECEIVED_SN") and the stored starting sequence number 255 ("STORED_SN") plus the length of the bitmap ("BITMAP_LENGTH") minus one. Accordingly, the shift is described as:

shift=RECEIVED_SN−(STORED_SN+BITMAP_LENGTH−1)

The PSM module 252 replaces the stored starting sequence number 255 with the stored sequence number plus the difference between the received sequence number and the length of the bitmap minus one for the plurality of frames received by the receiving station. In other words, the starting sequence number is:

STORED_SN+(RECEIVED_SN−(BITMAP_LENGTH−1))

These operations may be performed modulo the sequence number space, assuming a non-negative sequence number space.

Another memory management technique may be used when the memory space requirement for block acknowledgement structure storage exceeds the available amount of memory space otherwise allocated for block acknowledgement structure storage.

An entry for each TA and QoS value for which a block acknowledgement agreement exists is made in the CAM module 256. Because, in this example, there are more TA and QoS value pairs than there are block acknowledgement structures, multiple TA and QoS values may produce the same CAM lookup result (that is, the agreement memory index value 267 may have the same value for more than one TA and QoS value pair. In turn, more than one TA and QoS value pair may correspond to the same bitmap memory location). As a result, more than one distinct TA and QoS value pair may share a single agreement memory index value 267 and accordingly, also share a single block acknowledgement structure within the set of block acknowledgement structures 247.

As one of ordinary skill in the art may appreciate, the assignment of agreement sharing index values and agreement memory index values is arbitrary, but some allocations produce better performance than others. In any case, when resources are limited, the baseband processing module or software driver discerns which TA and QoS value pairs may share agreement memory index values 267, such that some specific TA and QoS pairs do not share agreement memory index values 267 and block acknowledgement structures 247 while others may, depending upon the number of BLOCK_ACK agreements and the amount of bitmap structure memory available. The TA and QoS pairs that are assigned an un-shared or unique agreement memory index value 267 and block acknowledgement structure 247 are generally reserved for those for which the probability of failure of the reception of a block acknowledgement transmission is relatively higher.

Figure 8A:
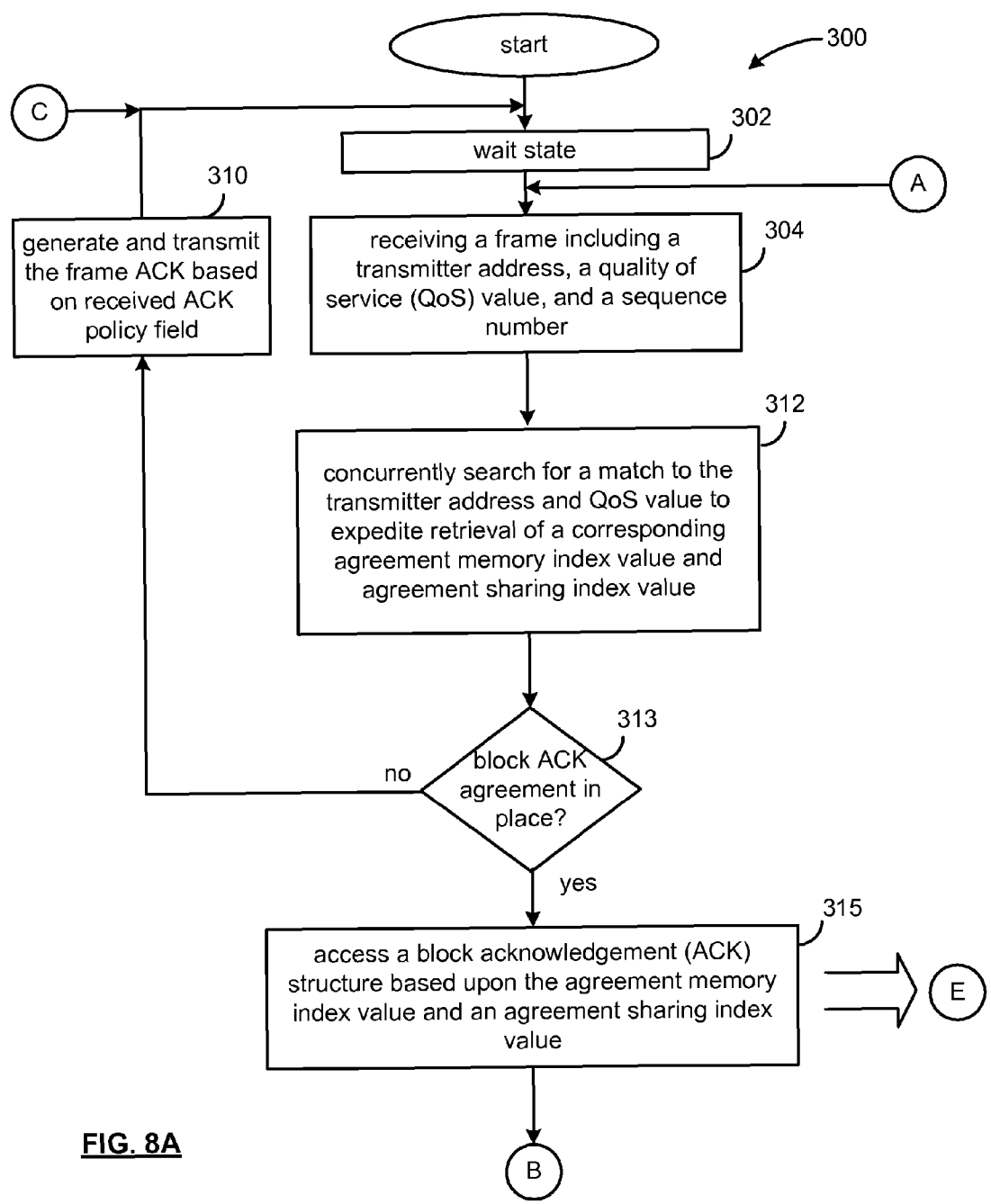
FIGS. 8A and 8B are flow diagrams illustrating a method in a wireless receiving station for fast generation of a block acknowledgment according to an embodiment of the invention.
Figure 8B:
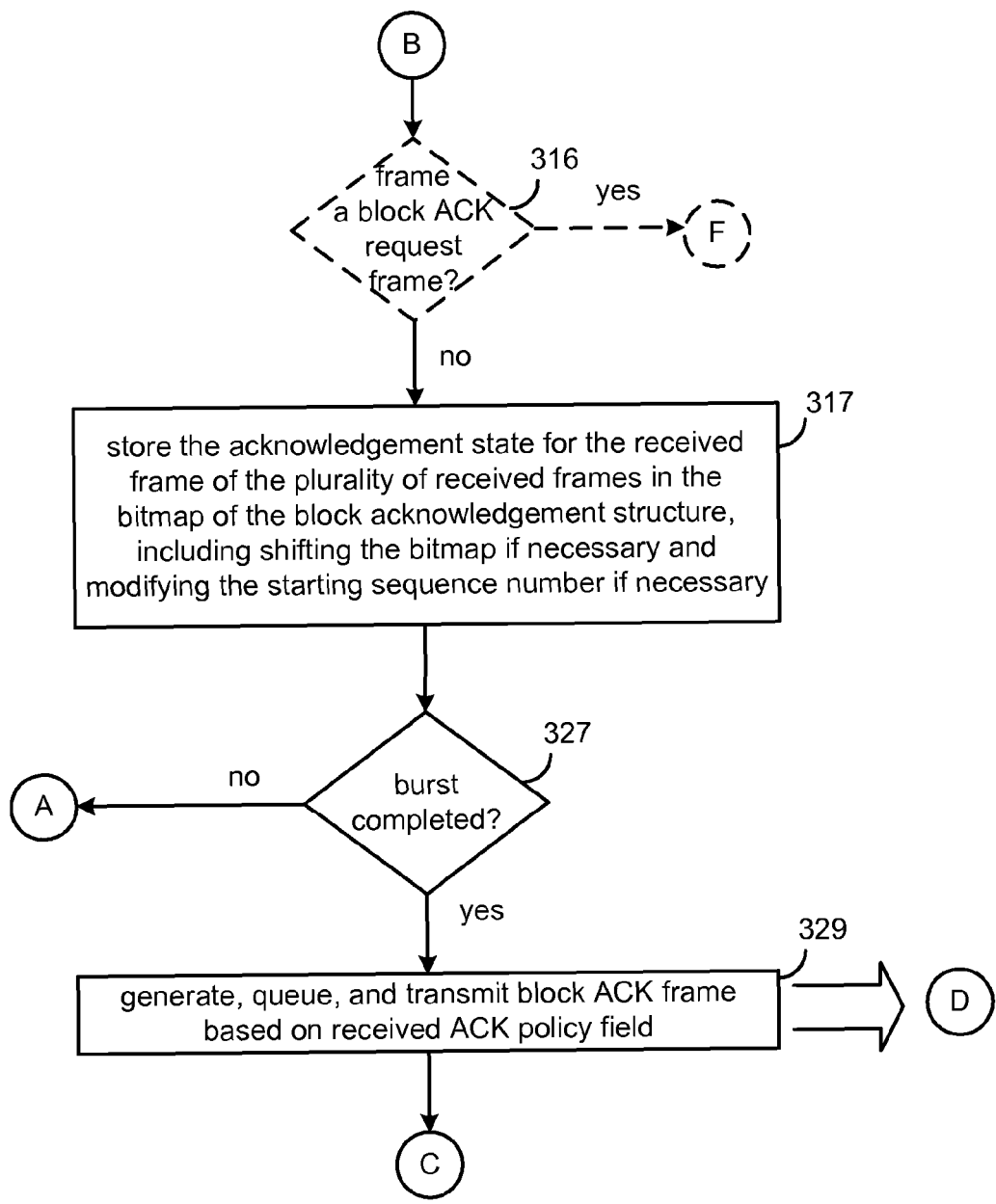

FIGS. 8A and 8B are flow diagrams illustrating a method 300 in a wireless receiving station for fast generation of a block acknowledgment for a plurality of received frames to accommodate latency-sensitive data applications, where the each frame includes a preamble and data.

At step 302, the receiving station is in a wait state for a transmission, such as that from a transmitting station. Upon initiation of traffic over the wireless medium, the receiving station receives a frame at step 304. The frame includes a transmitter address, a quality of service (QoS) value, and a sequence number.

At step 312, a concurrent search for a match to the transmitter address and QoS value to expedite retrieval of a corresponding agreement memory index value and an agreement sharing index value, which together are mapped in relation to the transmitter address and the QoS value (see FIG. 6).

At step 313, the bitmap generator determines whether a block acknowledgment agreement is in place between the receiver and the transmitter. Determining whether the agreement is in place may take place by comparing the agreement memory index value to a NULL value. When the agreement memory index value returned by the CAM lookup operation is equivalent to a NULL value, then this signifies that no block acknowledgement agreement is in place between the receiver and the transmitter of the received frame. Accordingly, no further specific block acknowledgement related activity is needed.

When a block acknowledgement agreement is not in place, then at step 310 a "normal" acknowledgement frame (ACK) is generated in response to the received frame (presuming the received ACK policy field calls for an ACK response). As an alternative, a block ACK frame may be sent in response to the received frame with one bit of a bitmap set, the set bit corresponding to the sequence number of the received frame.

Otherwise, when a block ACK agreement is in place at step 313, then at step 315, the bitmap generator accesses a block acknowledgment (ACK) structure based upon the agreement memory index value and an agreement sharing index value associated with a bitmap structure received in response to a content search term.

In FIG. 8B, step 316, shown in dashed lines, accommodates instances where the frame is not a data frame, but may be an explicit block ACK request frame received by the wireless device. When the frame is a block request frame, the bitmap information, at step 408 (see FIG. 9) is retrieved for the corresponding BLOCK_ACK agreement and is used to create a block ACK frame. When the frame is not a block ACK request frame (such as a data frame), then at step 317, the bitmap generator stores the acknowledgement state for the received frame in the bitmap of the block acknowledgement structure. As needed, the bitmap may be shifted, and the starting sequence number may be modified, as discussed in detail with reference to FIG. 7.

Generally, the bitmap generator updates the bitmap of any frame that corresponds to an existing BLOCK_ACK agreement regardless of the ACK policy field value of a received frame because a transmitter may send a frame with either a block ACK policy setting or a non-block ACK policy setting despite a block acknowledgement agreement being in place for any given TA and QoS value pair. In this manner, the acknowledgment mechanism may use the bitmap structure for either aggregated acknowledgment or single-acknowledgment.

At step 327, the radio determines whether the present or current receipt of a plurality of frames, or frame burst, is complete. When the burst is not complete, then the radio returns to step 304 of FIG. 8A to receive and have the bitmap generator to update the appropriate bitmap accordingly. When the burst is complete at step 327, then at step 329, the radio generates, queues, and transmits a block ACK frame based on the received ACK policy field, which is discussed in detail with reference to FIG. 9. Afterwards, the radio returns to step 302 (see FIG. 8A) to wait for another transmission.

Figure 9:
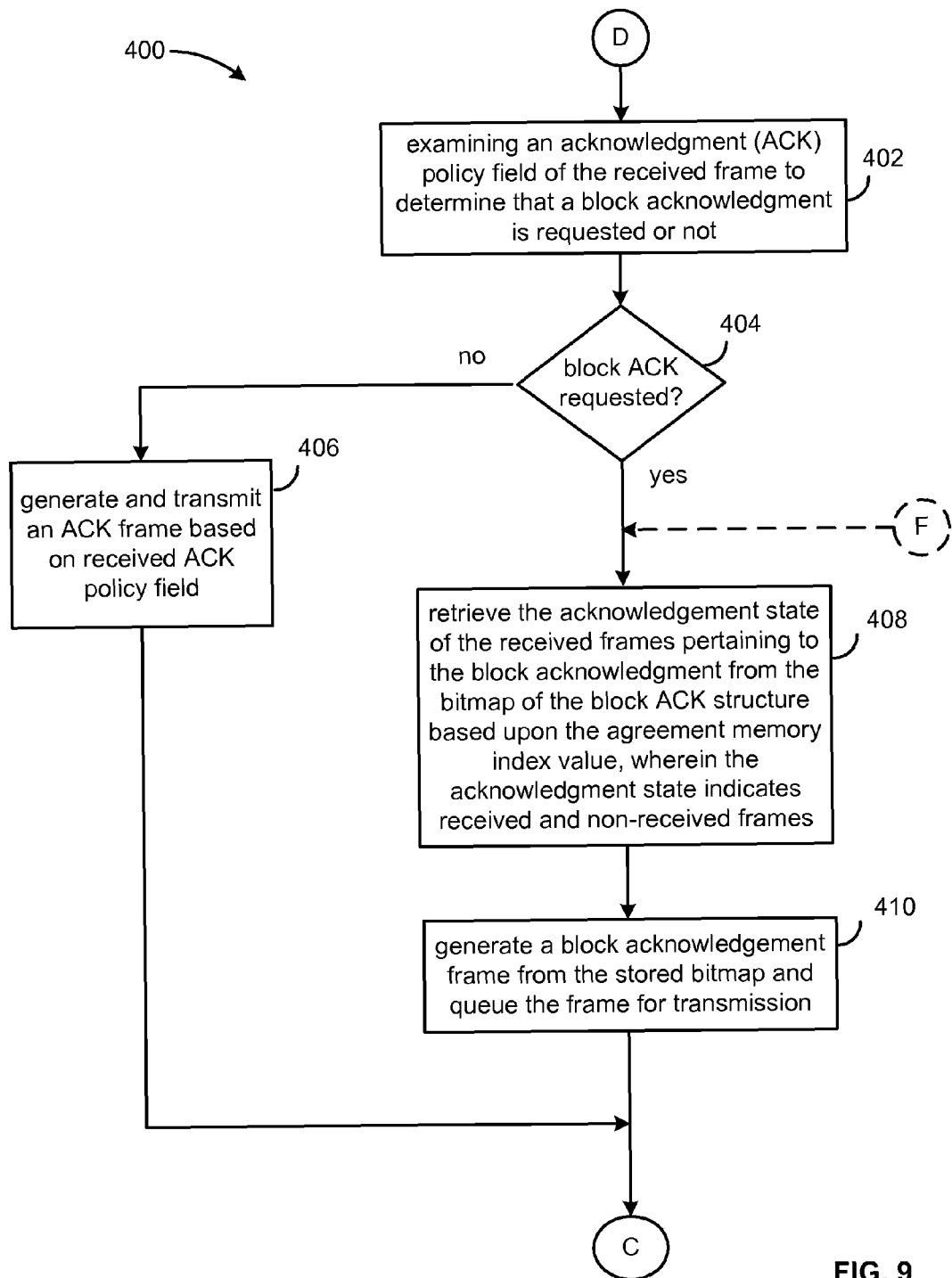
FIG. 9 is a flow diagram illustrating a method to generate, queue, and transmit a block ACK frame according to an embodiment of the invention.

FIG. 9 illustrates is a flow diagram illustrating a method to generate, queue, and transmit a block ACK frame. When in FIG. 8B the burst is complete at step 329, the acknowledgement (ACK) policy field of the received frame is examined to determine that a block acknowledgement is requested at step 402. Under the IEEE 802.11 specification, the transmitting station indicates the acknowledgment mode for the transmission by the ACK policy field, which has one of four acknowledgment values which, depending on other indications received with the frame, may be expanded to accommodate more than four acknowledgement modes. At step 404, the radio determines whether a block ACK was requested via the acknowledgement policy field of the received frame.

When block ACK is not requested in step 404, then at step 406 the radio generates and transmits a frame ACK based on the ACK policy field of the received frame (which may also be an instruction to not generate and transmit any ACK frame).

When at step 404, a block ACK had been requested, then at step 408, the radio accesses a bitmap of a block acknowledgement structure to generate a block ACK frame. The radio generates the block ACK frame is based upon the agreement memory index value to retrieve an acknowledgment state of each of the received frames pertaining to the block acknowledgment (including indications of frames not received) and a starting sequence number. At step 332, the block ACK frame is generated and queued for transmission. Following transmission, the radio returns to the wait state of step 302 in FIG. 8A to wait for the next reception of a frame.

Figure 10:
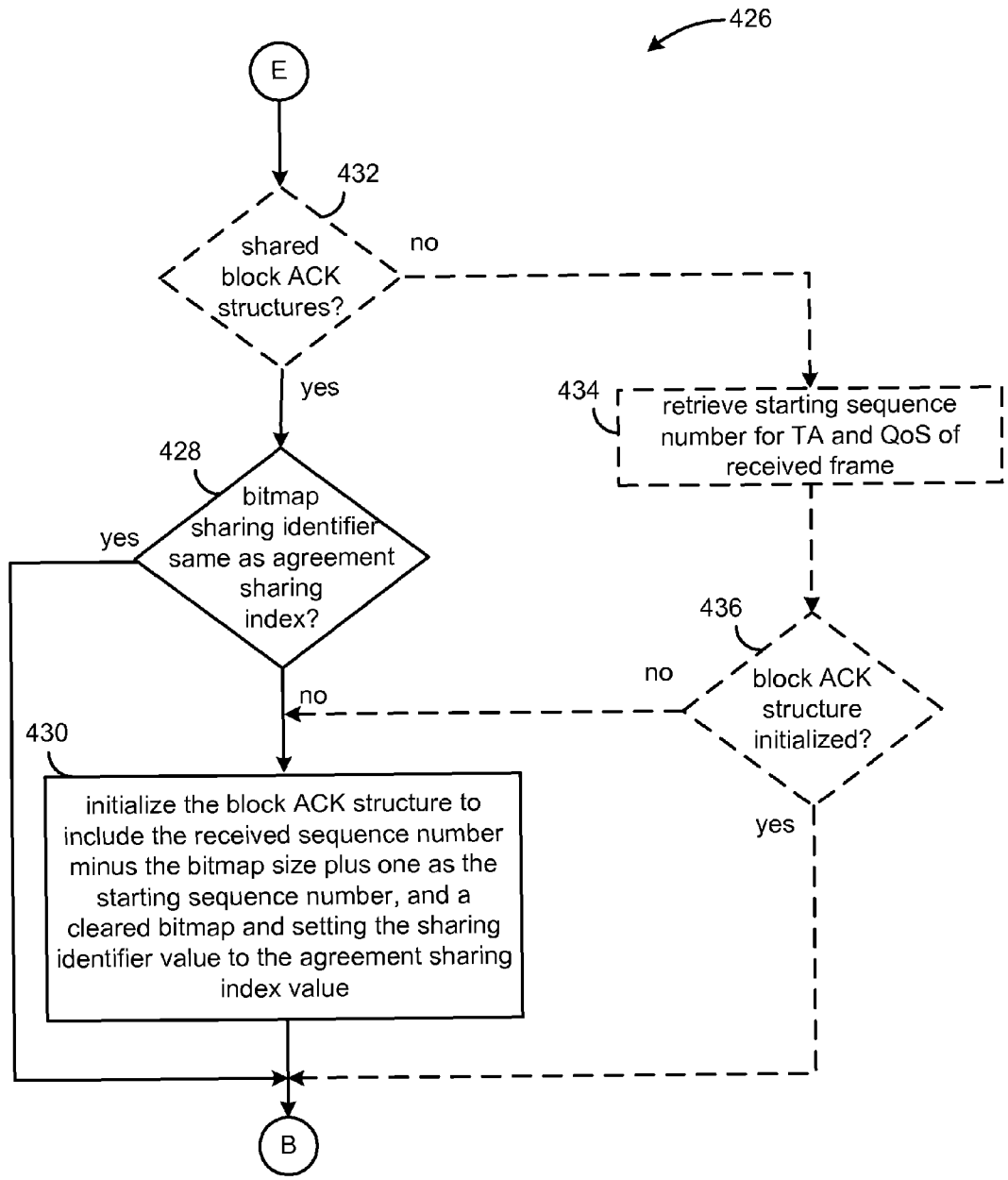
FIG. 10 is a flow diagram illustrating a method for initializing a block acknowledgment structure according to an embodiment of the invention.

FIG. 10 is a flow diagram illustrating a method 426 for initializing a block acknowledgment structure. The initialization method stems from a change in an agreement sharing index value with respect to a bitmap sharing index value, which has been retrieved at step 315 of FIG. 8A. At step 428, the agreement sharing index is compared to the bitmap sharing identifier. When there is a mismatch, or unfavorable comparison, between the two values, then at step 430, the block ACK structure located in the bitmap memory at the agreement memory index value is initialized by setting the starting sequence number of the bitmap structure to the received sequence number minus the bitmap size plus one. The bitmap generator clears the bitmap and sets the bitmap sharing identifier value to the agreement sharing index value. Afterwards, the process returns to step 317.

Alternatively, a bitmap sharing identifier value 276 of the block acknowledgment structure may not be used, such as when the number of block acknowledgement agreements made by the radio 60 (that is, a QSTA) does not exceed the memory available for block acknowledgement structure storage. In this instance, the bitmap generator only needs to initialize the bitmap at the time that a BLOCK_ACK agreement is established.

In the instance where the number of block acknowledgment agreements does exceed the available memory, an entry is made in the search device, such as the CAM module, for each TA and QoS value of the existing block acknowledgement agreement. Because there are more TA and QoS value pairs than there are available block acknowledgement structures, multiple TA and QoS values may produce the same CAM lookup result, that is, the same agreement memory index value 267.

The radio 60 determines which TA and QoS value pairs share which agreement memory indexes, such that those that are required to share an agreement memory index value will each be assigned a unique agreement sharing index value. The radio 60 may "discriminate," such that some specific TA and QoS value pairs do not share agreement memory index values and a single block acknowledgement structure. The TA and QoS pairs that are assigned an un-shared agreement memory index and block acknowledgement structure are generally reserved for those pairs for which the probability of failure of the reception of a block acknowledgement transmission is relatively higher.

In such an alternative embodiment, as indicated with the dashed lines of FIG. 10, the starting sequence number 255 (or another suitable value in the structure) is retrieved at step 434, which is used at step 436 to determine whether the block ACK structure has been initialized. At step 436, the starting sequence number is tested for a NULL value (or to test some other value in the block ACK structure to determine if the block acknowledgement structure has been initialized). When the block ACK structure has not been initialized, the block ACK structure is initialized at step 430.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (for example, an item includes, but is not limited to, a component, an element, a circuit, and/or a module) where, for indirect coupling, the intervening item does not modify the information of a signal but may adjust its current level, voltage level, and/or power level. As may further be used herein, inferred coupling (that is, where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that first signal has a greater magnitude than a second signal, a favorable comparison may be achieved when the magnitude of the first signal is greater than that of the second signal or when the magnitude of the second signal is less than that of first signal.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has further been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

What is claimed is:

1. A method in a wireless receiving station for fast generation of a block acknowledgment for a plurality of received frames to accommodate latency-sensitive data applications comprises:
    receiving a frame of the plurality of received frames, via a receiver, including a transmitter address, a quality of service (QoS) value, and a sequence number;
    concurrently searching for a match to the transmitter address and the QoS value to expedite access to a block acknowledgment (ACK) structure, wherein the match provides an index to the block ACK structure, the concurrently searching includes accessing the block ACK structure to:
        testing a sharing identifier of the block ACK structure; and
        when the sharing identifier tests unfavorably, initializing the block ACK structure to include, as a stored sequence number, the received sequence number minus a bitmap size plus one and the block ACK structure to include a cleared bitmap; and
    when a block ACK agreement exists that corresponds to the transmitter address and the QoS value:
        accessing the block ACK structure based upon the index and storing an acknowledgement state for the received frame in a bitmap of the block ACK structure; and
        when receipt of the plurality of frames is complete, generating, queuing, and transmitting, via a transmitter, a block ACK frame based upon an ACK policy field of the received frame.

2. The method of claim 1 further comprises:
    when a block ACK agreement exists that corresponds to the transmitter address and the QoS value and the received frame is a block ACK request frame:
    retrieving the acknowledgement state for the plurality of received frames from the bitmap of the block ACK structure based upon the index;
    generating the block ACK frame from the bitmap and queuing the frame for transmission; and
    transmitting the block ACK frame.

3. The method of claim 1 wherein storing the acknowledgment state of the received frame comprises:
    setting a bit of the bitmap corresponding to the sequence number.

4. The method of claim 1 wherein initializing the block ACK structure comprises:
    clearing bits of the bitmap and
    replacing the stored sequence number with a received sequence number minus the bitmap size plus one.

5. The method of claim 1 wherein an unfavorable test of the sharing identifier indicates a change in the transmitter address.

6. The method of claim 1 wherein the concurrently searching further comprises adjusting the block ACK structure by:
    shifting bits of the bitmap according to a difference between the stored sequence number and a subsequent received sequence number; and
    replacing the stored sequence number with the stored sequence number plus the amount of the shift.

7. The method of claim 1 wherein the concurrently searching is performed with a content addressable memory (CAM) module.

8. Apparatus for fast block acknowledgment generation of a plurality of received frames to accommodate latency-sensitive data applications, each frame of the plurality of frames including a transmitter address, a quality of service (QoS) value, and a sequence number, the apparatus comprises:
- a radio front end for producing an inbound continuous waveform signal;
- analog-to-digital conversion circuitry for converting the inbound continuous waveform signal from an analog domain to an inbound digital signal;
- a baseband processing module operably disposed to receive and process the inbound digital signal; and
- memory coupled to the baseband processing module, wherein the memory stores operational instructions that cause the baseband processing module to:
  - receive a frame of the plurality of received frames including a transmitter address, a quality of service (QoS) value, and a sequence number;
  - concurrently search for a match to the transmitter address and the QoS value to expedite access to a block acknowledgment (ACK) structure, wherein the match provides an index to the block ACK structure, the concurrently searching includes accessing the block ACK structure to:
    - test a sharing identifier of the block ACK structure; and
    - when the sharing identifier tests unfavorably, initialize the block ACK structure to include, as a stored sequence number, the received sequence number minus a bitmap size plus one and the block ACK structure to include a cleared bitmap;
  - when a block ACK agreement exists that corresponds to the transmitter address and the QoS value:
    - access the block ACK structure based upon the index and store an acknowledgement state for the received frame in a bitmap of the block ACK structure; and
    - when receipt of the plurality of frames is complete, generate, queue, and transmit a block ACK frame based upon an ACK policy field of the received frame.

9. The apparatus of claim 8 wherein the memory further stores operational instructions that cause the baseband processing module to:
- when a block ACK agreement exists that corresponds to the transmitter address and the QoS value and the received frame is a block ACK request frame:
  - retrieve the acknowledgement state for the plurality of received frames from the bitmap of the block ACK structure based upon the index;
  - generate the block ACK frame from the bitmap and queue the frame for transmission; and
  - transmit the block ACK frame.

10. The apparatus of claim 8 wherein the memory further stores operational instructions that cause the baseband processing module to store the acknowledgment state for the received frame by:
- setting a bit of the bitmap corresponding to the sequence number.

11. The apparatus of claim 8 wherein the memory further stores operation instructions that cause the baseband processing module to initialize the block ACK structure by:
- clearing bits of the bitmap; and
- replacing the stored sequence number with the received sequence number minus the bitmap size plus one.

12. The apparatus of claim 8 wherein an unfavorable test of the sharing identifier indicates a change in the transmitter address.

13. The apparatus of claim 8 wherein the memory further stores operational instructions that cause the baseband processing module to adjust the block ACK structure by:
- shifting bits of the bitmap according to a difference between the stored sequence number and a subsequent received sequence number; and
- replacing the stored sequence number with the subsequent received sequence number.

14. Apparatus for fast block acknowledgment generation of a plurality of received frames to accommodate latency-sensitive data applications comprises:
- a content addressable memory (CAM) module that is concurrently searchable for matches to a transmitter address and a quality of service (QoS) value for expedited retrieval of a corresponding memory index value, which is mapped in relation to the transmitter address and the QoS value;
- programmable state machine (PSM) memory including a block acknowledgment (ACK) structure having a plurality of bitmaps, the PSM memory for storing the transmitter address and QoS value of a received frame of the plurality of received frames; and
- a PSM module coupled to the CAM module and to the PSM memory, wherein the PSM module functions, upon a block acknowledge request of the received frame of a plurality of frames, to
  - search the CAM module for a match to a transmitter address of the received frame from the plurality of pre-stored transmitter addresses to expedite retrieval of a corresponding agreement memory index value and agreement sharing index value, wherein the search of the CAM module includes accessing the block ACK structure by:
    - testing a sharing identifier of the block ACK structure; and
    - when the sharing identifier tests unfavorably, initializing the block ACK structure to include as a stored sequence number a received sequence number of the received frame minus a bitmap size plus one and a cleared bitmap;
  - access the block ACK structure with the corresponding agreement memory index value and the agreement sharing index value;
  - store an acknowledgment state for the received frame of the plurality of frames in a bitmap of the plurality of bitmaps; and
  - when a burst of the plurality of received frames is completed, generate, queue, and transmit a block ACK frame based on a received ACK policy field of the received frame.

15. The apparatus of claim 14 wherein the PSM module functions to store the acknowledgment state of the received frame by:
- setting a bit of the bitmap corresponding to the sequence number.

16. The apparatus of claim 14 wherein initializing the block ACK structure comprises:
- clearing bits of the bitmap and
- replacing the stored sequence number with the received sequence number minus the bitmap size plus one.

17. The apparatus of claim 14 wherein the sharing identifier indicates a change in the transmitter address.

* * * * *